United States Patent
Mustafi

(10) Patent No.: US 11,243,948 B2
(45) Date of Patent: Feb. 8, 2022

(54) SYSTEM AND METHOD FOR GENERATING ANSWERS TO NATURAL LANGUAGE QUESTIONS BASED ON DOCUMENT TABLES

(71) Applicant: salesforce.com, inc., San Francisco, CA (US)

(72) Inventor: Joy Mustafi, Telangana (IN)

(73) Assignee: salesforce.com, inc., San Francisco, CA (US)

(*) Notice: Subject to any disclaimer, the term of this patent is extended or adjusted under 35 U.S.C. 154(b) by 76 days.

(21) Appl. No.: 16/536,172

(22) Filed: Aug. 8, 2019

(65) Prior Publication Data

US 2021/0042308 A1    Feb. 11, 2021

(51) Int. Cl.
| | |
|---|---|
| *G06F 16/2452* | (2019.01) |
| *G06F 16/242* | (2019.01) |
| *G06F 16/22* | (2019.01) |
| *G06F 7/14* | (2006.01) |
| *G06F 16/28* | (2019.01) |

(52) U.S. Cl.
CPC .......... *G06F 16/24522* (2019.01); *G06F 7/14* (2013.01); *G06F 16/2282* (2019.01); *G06F 16/243* (2019.01); *G06F 16/285* (2019.01)

(58) Field of Classification Search
CPC ................ G06F 16/951; G06F 16/243; G06F 16/24522; G06F 40/30
USPC ....................................................... 707/760
See application file for complete search history.

(56) References Cited

U.S. PATENT DOCUMENTS

| | | |
|---|---|---|
| 7,730,478 B2 | 6/2010 | Weissman |
| 7,779,039 B2 | 8/2010 | Weissman et al. |
| 8,966,439 B2 | 2/2015 | Wolfram |
| 9,330,084 B1 | 5/2016 | Kadambi et al. |
| 9,430,557 B2 | 8/2016 | Bhat et al. |
| 9,430,558 B2 | 8/2016 | Bhat et al. |
| 9,460,075 B2 | 10/2016 | Mungi et al. |
| 9,495,355 B2 | 11/2016 | Mungi et al. |
| 9,514,185 B2 | 12/2016 | Mungi et al. |
| 9,535,894 B2 | 1/2017 | Carrier et al. |
| 9,613,091 B2 | 4/2017 | Mungi et al. |

(Continued)

FOREIGN PATENT DOCUMENTS

WO    WO 2013013173 A2    1/2013

OTHER PUBLICATIONS

IBM Watson Analytics, retrieved from the internet, http://www.ibm.com/analytics/watson-analytics/ (1 page).

(Continued)

*Primary Examiner* — Hung T Vy
(74) *Attorney, Agent, or Firm* — Haynes and Boone, LLP

(57) ABSTRACT

Embodiments described herein provide a mechanism that translates a natural language question to a database query format that may be applied to a data table to generate an answer to the natural language question. The system may identify key terms from a natural language question and classify the key terms as variable names or operation names. The natural language question is than translated into a format of question template containing variable names and operation names. In this way, the system may map the template question to a database query which can be applied to operate on a relational database to identify a cell value that represents an answer to the natural language question.

20 Claims, 10 Drawing Sheets

(56) References Cited

U.S. PATENT DOCUMENTS

| | | |
|---|---|---|
| 9,684,876 B2 | 6/2017 | Agarwalla et al. |
| 9,916,303 B2 | 3/2018 | Mungi et al. |
| 10,102,276 B2 | 10/2018 | Joshi et al. |
| 10,133,732 B2 | 11/2018 | Mungi et al. |
| 10,275,712 B2 | 4/2019 | Bhat et al. |
| 10,275,713 B2 | 4/2019 | Bhat et al. |
| 10,318,641 B2 | 6/2019 | Mustafi et al. |
| 10,320,633 B1 * | 6/2019 | Wong .................. H04L 67/02 |
| 10,417,581 B2 | 9/2019 | Agarwalla et al. |
| 10,426,551 B2 | 10/2019 | Gupta et al. |
| 10,489,229 B2 | 11/2019 | Mustafi et al. |
| 10,521,513 B2 | 12/2019 | Mustafi et al. |
| 2008/0263403 A1 | 10/2008 | Soklakov |
| 2009/0144295 A1 * | 6/2009 | Mion ..................... G06F 16/00 |
| 2010/0281350 A1 | 11/2010 | Xie et al. |
| 2013/0304688 A1 | 11/2013 | Osogami et al. |
| 2014/0250045 A1 | 9/2014 | Bounouane et al. |
| 2015/0331846 A1 | 11/2015 | Guggilla et al. |
| 2016/0180437 A1 * | 6/2016 | Boston .................. G06F 40/30 |
| | | 705/26.7 |
| 2016/0292153 A1 | 10/2016 | Agarwalla et al. |
| 2017/0039192 A1 | 2/2017 | Mustafi et al. |
| 2017/0039193 A1 | 2/2017 | Mustafi et al. |
| 2017/0052985 A1 | 2/2017 | Guggilla et al. |
| 2017/0052988 A1 | 2/2017 | Guggilla et al. |
| 2018/0160894 A1 | 6/2018 | Gupta et al. |
| 2019/0362265 A1 | 11/2019 | Agarwalla et al. |

OTHER PUBLICATIONS

MS Excel: "Convert numbers into words", retrieved from the internet, https://support.microsoft.com/en-us/kb/213360 (4 pages).

MS Azure Machine Learning, , retrieved from the internet, http://azure.microsoft.com/en-in/services/machine-learning/ (2 pages).

K. Morton et al., "A Novel Framework for Math Word Problem Solving," International Journal of Information and Education Technology, vol. 3, No. 1, Feb. 2013 (6 pages).

* cited by examiner

The school has four sections A, B, C, D of Class IX students. The results of half yearly and annual examinations are shown in the table given below.

| Result | No. of Students | | | |
|---|---|---|---|---|
| | Section A | Section B | Section C | Section D |
| Students failed in both Exams | 28 | 23 | 17 | 27 |
| Students failed in half-yearly but passed in Annual Exams | 14 | 12 | 8 | 13 |
| Students passed in half-yearly but failed in Annual Exams | 6 | 17 | 9 | 15 |
| Students passed in both Exams | 64 | 55 | 46 | 76 |

| Year | Salary | Bonus |
|---|---|---|
| 1998 | 288 | 3.00 |
| 1999 | 342 | 2.52 |
| 2000 | 324 | 3.84 |
| 2001 | 336 | 3.68 |
| 2002 | 420 | 3.96 |

+

504 — D4

| Year | Fuel and Transport | Interest on Loans | Taxes |
|---|---|---|---|
| 1998 | 98 | 23.4 | 83 |
| 1999 | 112 | 32.5 | 108 |
| 2000 | 101 | 41.6 | 74 |
| 2001 | 133 | 36.4 | 88 |
| 2002 | 142 | 49.4 | 98 |

D3 + D4

501 — D1

| Year | Item of Expenditure ||||
| | Salary | Fuel and Transport | Bonus | Interest on Loans | Taxes |
|---|---|---|---|---|---|
| 1998 | 288 | 98 | 3.00 | 23.4 | 83 |
| 1999 | 342 | 112 | 2.52 | 32.5 | 108 |
| 2000 | 324 | 101 | 3.84 | 41.6 | 74 |

+

502 — D2

| Year | Item of Expenditure |||||
| | Salary | Fuel and Transport | Bonus | Interest on Loans | Taxes |
|---|---|---|---|---|---|
| 2001 | 336 | 133 | 3.68 | 36.4 | 88 |
| 2002 | 420 | 142 | 3.96 | 49.4 | 98 |

D1 + D2

510 — ITEM_OF_EXPENDITURE

| YEAR | SALARY | FUEL AND TRANSPORT | BONUS | INTEREST ON LOANS | TAXES |
|---|---|---|---|---|---|
| 1998 | 288 | 98 | 3.00 | 23.4 | 83 |
| 1999 | 342 | 112 | 2.52 | 32.5 | 108 |
| 2000 | 324 | 101 | 3.84 | 41.6 | 74 |
| 2001 | 336 | 133 | 3.68 | 36.4 | 88 |
| 2002 | 420 | 142 | 3.96 | 49.4 | 98 |

SYSTEM AND METHOD FOR GENERATING ANSWERS TO NATURAL LANGUAGE QUESTIONS BASED ON DOCUMENT TABLES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES

This application is related to co-pending and commonly-owned U.S. application Ser. No. 16/536,165, filed on the same day, which is hereby expressly incorporated by reference herein in its entirety.

TECHNICAL FIELD

The present disclosure generally relates to question and answer models, and more specifically, to systems and methods for generating answers to natural language questions based on document tables.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Document tables usually have multiple columns illustrating multiple types of data values. Existing systems may perform data table operations on the cell values, such as sorting the cell values of a particular column, locating the maximum or minimum value of the particular column, etc. However, existing systems can only perform database operations according to a formatted database formula, which needs to be manually input by a user. For example, existing system may respond to a database query to locate the maximum cell value in a column under a specific column name, e.g., "MAX (COLUMN='POPULATION')." Existing systems, however, cannot understand a natural language question that is not pre-formatted as a database query to correlate data values in the data table for the natural language question.

BRIEF DESCRIPTION OF THE DRAWINGS

FIGS. 5A-5B are simplified diagrams illustrating example data tables that may be transformed into relational data tables to apply a database query, according to embodiments described herein.

Figure 1:
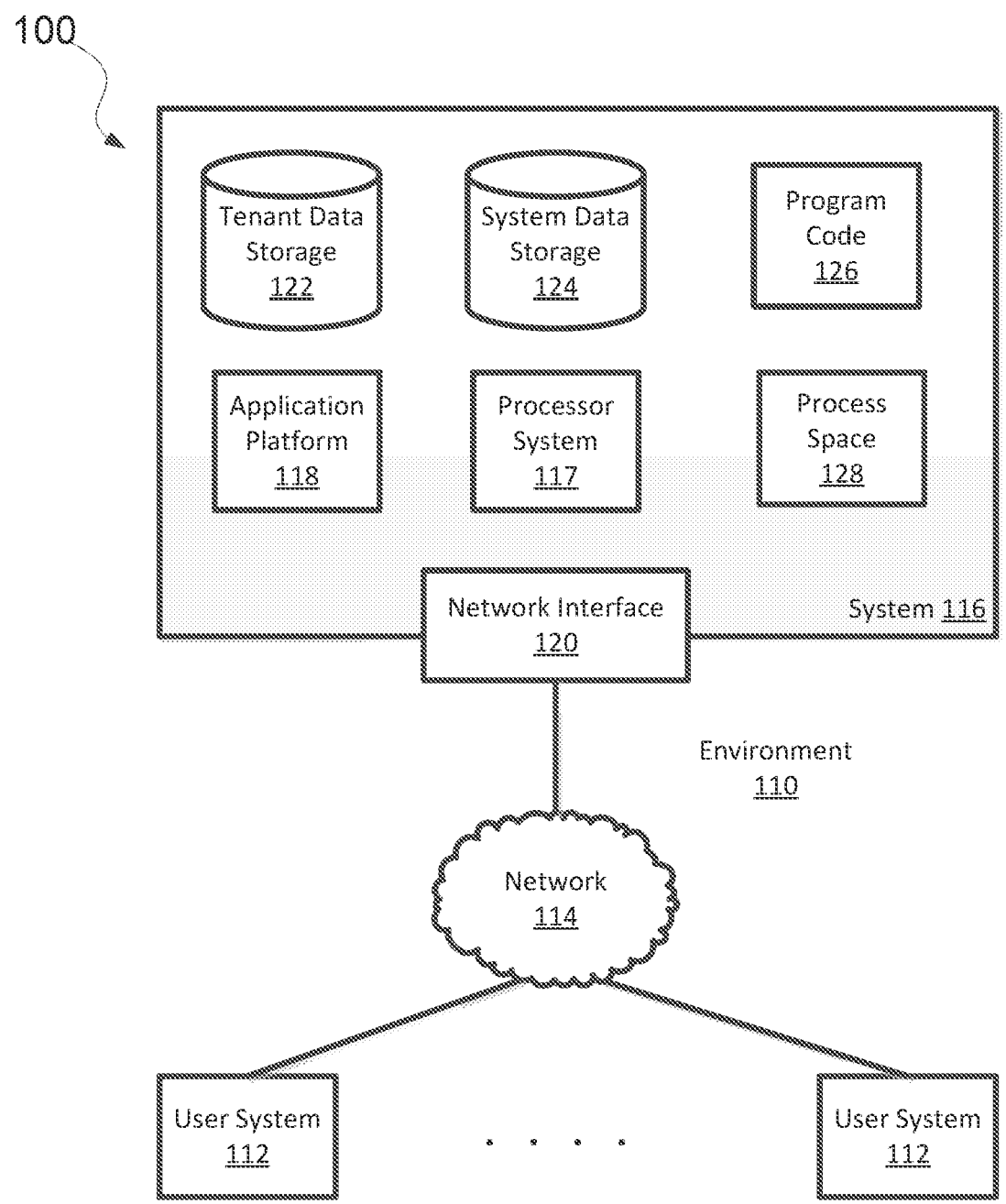
FIG. 1 illustrates a block diagram of an example environment wherein systems and methods for answering a natural language question based on data tables may be provided and used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented on one or more neural networks.

Overview

In view of the need for understanding a natural language question and locating an answer to the natural language question from a data table, embodiments described herein provide a mechanism that translates a natural language question to a database query format that may be applied to a data table to generate an answer to the natural language question. For example, a natural language question may ask "in 1999, where are the maximum number of selected candidates located?" The system may identify key terms from the question and classify the key terms as possible variable names or an operation name. For example, "number of selected candidates" may correspond to a variable name, and "maximum" may correspond to an operation. The question is then represented by a format of "which <key phrase> has <operation> <column_name> in <column_name>," e.g., "which state has maximum selected candidates in 1999." In this way, the system may translate the natural language question to a database query format "SELECT <column_name> PERFORM <operation>" to identify a cell value that represents an answer to the natural language question.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may provide the data table transformation from an unstructured table to a one-dimensional relational table, as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. In some implementations, the on-demand database service may include operations on a relational database. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
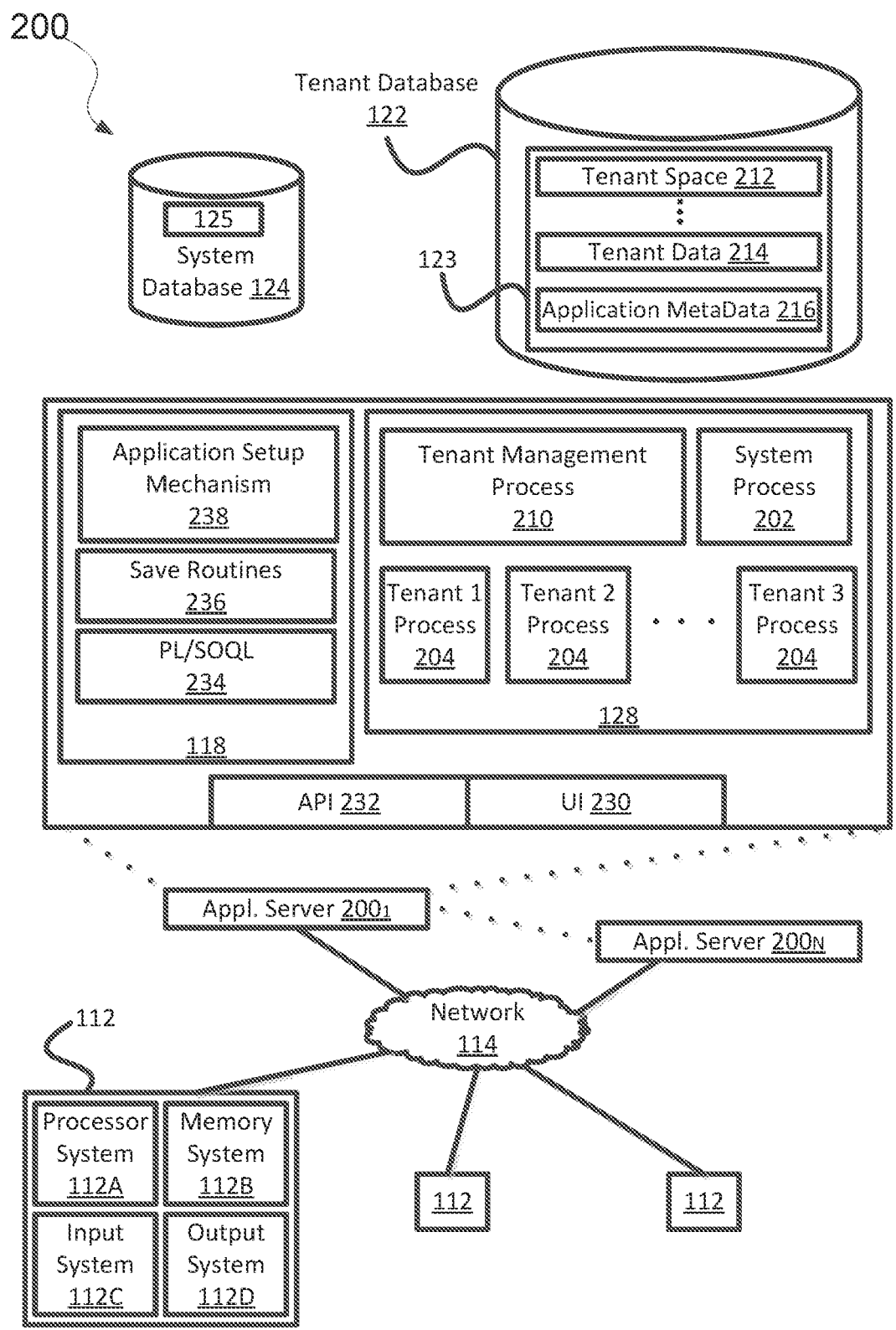
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5

Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

Neural Model

According to some embodiments, in a multi-tenant database system accessible by a plurality of separate and distinct organizations, such as system 116 shown and described with respect to FIGS. 1 and 2, a question answering module is provided for translating a natural language question to a database query that generates a value represents an answer to the natural language question. The question answering module may be installed or implemented at a computing device shown in FIG. 3.

Figure 3:
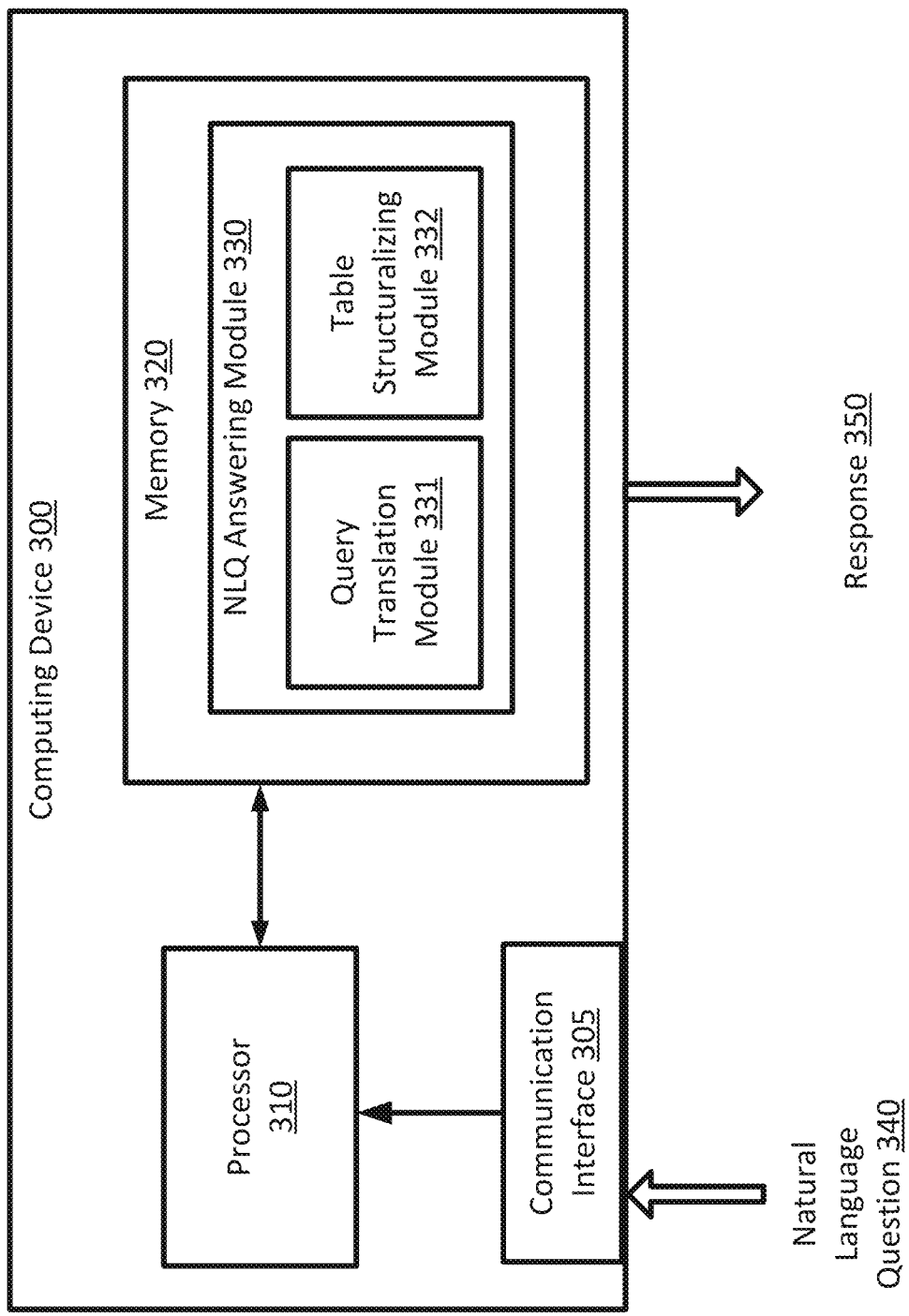
FIG. 3 is a simplified diagram of a computing device implementing natural language question answering, according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a question answering module 330 for translating an input natural language question 340 obtained via the communication interface 305 into a database query suitable for an operation on a relational database to obtain a value from the database as the response 350 to the input question 340. For example, the input natural language question 340 may be a manually entered question by a user, a vocal question articulated by the user, and/or the like.

The question answering module 330 further includes sub-modules such as the question translation module 331 and a table structuralizing module 332. Specifically, the question translation module 331 is configured to identify key terms from the input natural language question 340, correlate the key terms to a database column name or a database operation name, and translate the natural language question 340 into a database query. Further details on operations of the question translation module 331 are further described in relation to FIGS. 4-9. The table structuralizing module 332 is configured to transform any unstructured table to a one-dimensional relational table based on the determined header pattern. Further details on operations of the table structuralizing module 332 can be found in co-pending and commonly-owned U.S. application Ser. No. 16/536,165, filed on the same day, which is hereby expressly incorporated by reference herein in its entirety.

After implementing and executing the question answering module 330, in some embodiments, the output response 350 provided by module 330 is global for the multi-tenant database system, such as system 116, and applied to or used for all organizations or tenants whose users or customers utilize system 116 for data object generation, management, and use. Computing device 300 may receive or intake the input natural language question 340 from a user of an organization or tenant accessing the database system. The input natural language question 340 can be any type data in that it can take the form of a typed question, a vocal question, a video recorded question, etc. In some embodiments, the input natural language question 340 is not constrained, restricted, or required to be in a particular form. Computing device 300 can receive the natural language question 340 through a user interface, a communication interface 305 via a communication network, and/or the like.

Figure 4:
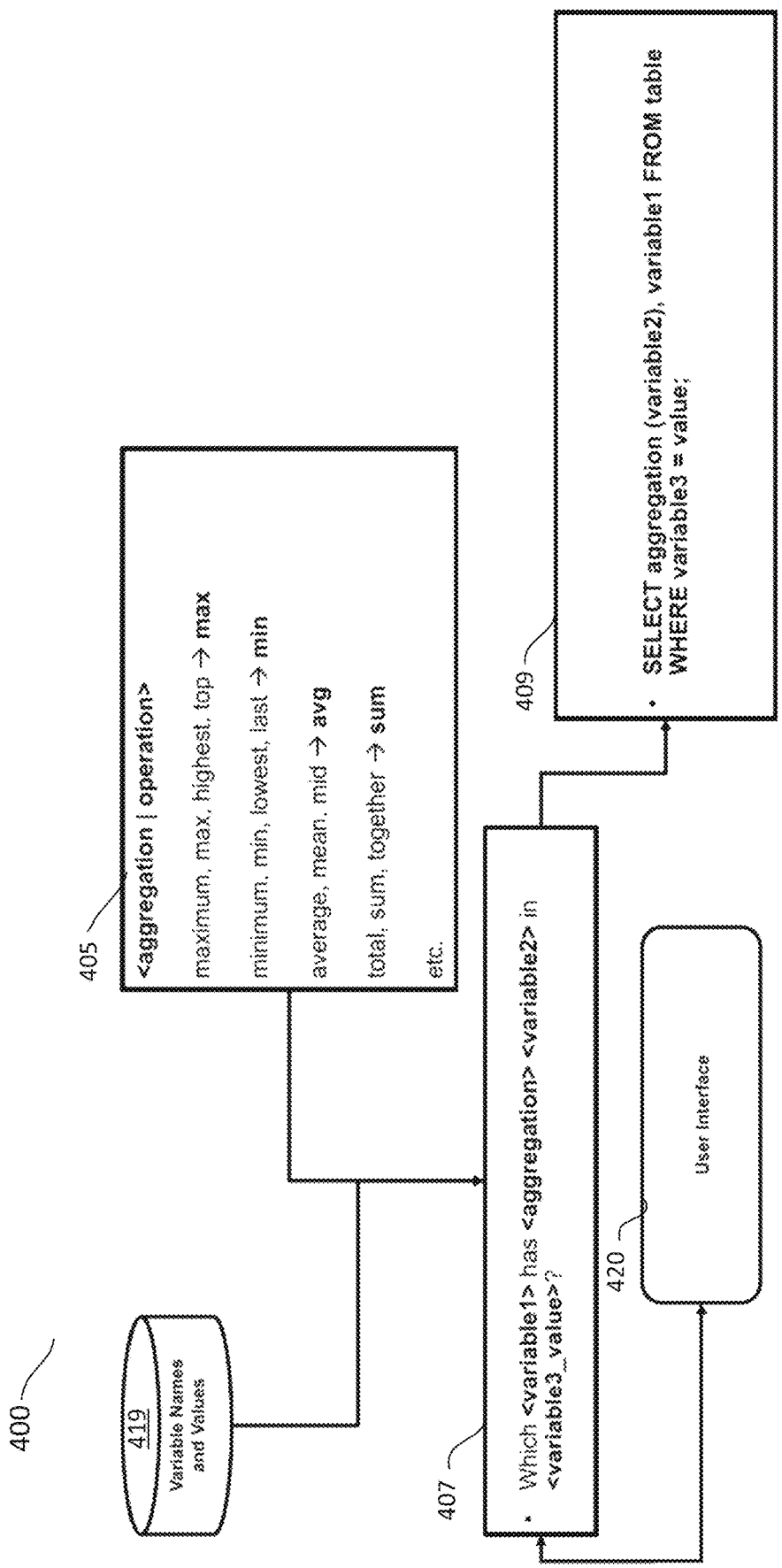
FIG. 4 is a simplified diagram illustrating an operation on translating a natural language question into a database query by the question translation module shown in FIG. 3, according to embodiments described herein.

FIG. 4 is a simplified diagram 400 illustrating an operation on translating a natural language question into a database query by the question translation module 331 show in FIG. 3, according to embodiments described herein. Diagram 400 shows a user interface 420 configured to receive a natural language question 407, e.g., "which city has the most subscribers with AT&T?" The natural language question 407 is then parsed into multiple key terms, e.g., "which," "city," "has," "most," "subscribers," "with," "AT&T." For each identified key term, the question translation module 331 may access a variable name database 419, or an operation name data table 405 to identify if any of the key terms corresponds to a variable name or an operation name. For example, the variable name database 419 stores a list of variable names that are used as column names and/or a list of variable values corresponding to the variable names from previously stored data tables. The operation name table 405 stores a list of database aggregation or operation names with possible variations of natural language terms, e.g., the "max" operation may correspond to terms "maximum," "highest," "largest," "most," etc. Here, key terms "city" and "subscriber" from the natural language question 407 may be identified with matching variable names and the term "AT&T" may be identified with a matching variable value corresponding to a variable name "carrier" in the variable name database 419. The key term "most" may be identified as corresponding to the operation "max" in the operation name data table 405. Thus, the natural language question 407 has a format of "which <variable_name1> has <aggregation/operation name> <variable_name2> in <variable_value3>," which is to be translated to the database query "SELECT max(subscribers), city FROM table where carrier=AT&T" 409. In this way, the translated database query 409 can be applied to a relational database that has the column header names "subscriber," "city" and "carrier."

FIGS. 5A-5B are simplified diagrams illustrating example data tables that may be transformed into relational data tables to apply a database query, according to embodiments described herein. In FIG. 5A, diagram 500 shows a data table that has multiple layers of hears. For example, the header name "number of students" has multiple sub-headers, e.g., "Section A," "Section B," "Section C," "Section D." The data table 500 having multiple layers of headers is expanded into a one-dimensional relational database, e.g., by the table structuralizing module 332, such that a structured database query can be applied to locate a cell value. For example, the data table 500 may be expanded to a table having a single row of headers "result," "section number," "number of students." Further details on transforming the data table into a one-dimensional relational data table can be found in co-pending and commonly-owned U.S. application Ser. No. 16/536,165.

FIG. 5B shows an example illustrating merging or appending multiple previously stored data tables to form an aggregated data table for question answering. For example, the formed database query 407 in FIG. 4 requires a data table that include columns under the headers of <variable_name1>, <variable_name2> and <variable_name3>. When no previously stored data table includes all three headers, the table structuralizing module 332 may identify multiple data tables that at least partially contain the headers and determine whether these data tables may be merged into an aggregated data table.

As shown in FIG. 5B, data tables D1 501 and D2 502 are appendable as the two data tables have the same headers. Thus, D1 501 and D2 502 can be merged by combining the rows under the same headers. In another example, data tables D3 503 and D4 504 are appendable as the two data tables shared the same column "Year." Thus, D3 503 and D4 504 can be merged by appending the columns from D3 to D4 corresponding to the same column "Year."

After merging tables D1 501 and D2 502, the merged table D1+D2 will have the column "Year" from 1998 to 2002. Thus, the merged table D1+D2 shares the same column "Year" with the merged table D3+D4 and can be further merged together to result in the aggregated table 510. The data table 510 now has headers (variable names) "Year," "Salary," "Fuel and Transport," "Bonus," "Interest on Loans," and "Taxes."

Figure 6:
FIG. 6 is a simplified diagram illustrating an example of answering a natural language question using an unstructured data table, according to embodiments described herein.

FIG. 6 is a simplified diagram illustrating an example of answering a natural language question using an unstructured data table, according to embodiments described herein. As shown at step 603, a natural language question "which state has maximum selected candidates in 1999" is received. The natural language question is then parsed into key terms such as "state," "maximum," "selected," "candidates," "1999."

Upon matching with previously stored variable names and operation names, the query translation module 331 may identify variable names "state," "selected candidates," an operation name "maximum," and a variable value "1999" corresponding to the variable name "Year." Thus, the natural language question is dissected in the form of "which <variable_name1> has <operation name> <variable_name2> in <variable_value>."

The table structuralizing module 332 may retrieve or identify a data table 601 that may be a candidate table to produce an answer to the natural language question, e.g., based on the caption of the table which mentions "number of candidates . . . over the years 1994 to 1998." The table structuralizing module 332 may transform the unstructured table 601 that has multiple layers of headers into a one-dimensional relational data table 605, as further described in co-pending and commonly-owned U.S. application Ser. No. 16/536,165. The one-dimensional data table 605 may be used for database queries.

Thus, the natural language question in the format of which <variable_name1> has <operation name> <variable_name2> in <variable_value>" may be translated, e.g., by template matching, into a database query operation "SELECT MAX (<variable_name2>), <variable_name1> from Table 605 where <variable_name3>=<variable_value>." In this example, the database query operation is "SELECT MAX(SEL), STATE FROM TABLE 605 WHERE YEAR=1999." The database query may return a query result of "82, Delhi" as shown at 603, where "82" represents the value of "MAX(SEL)" and "Delhi" represents the value for variable name "STATE."

Figure 7:
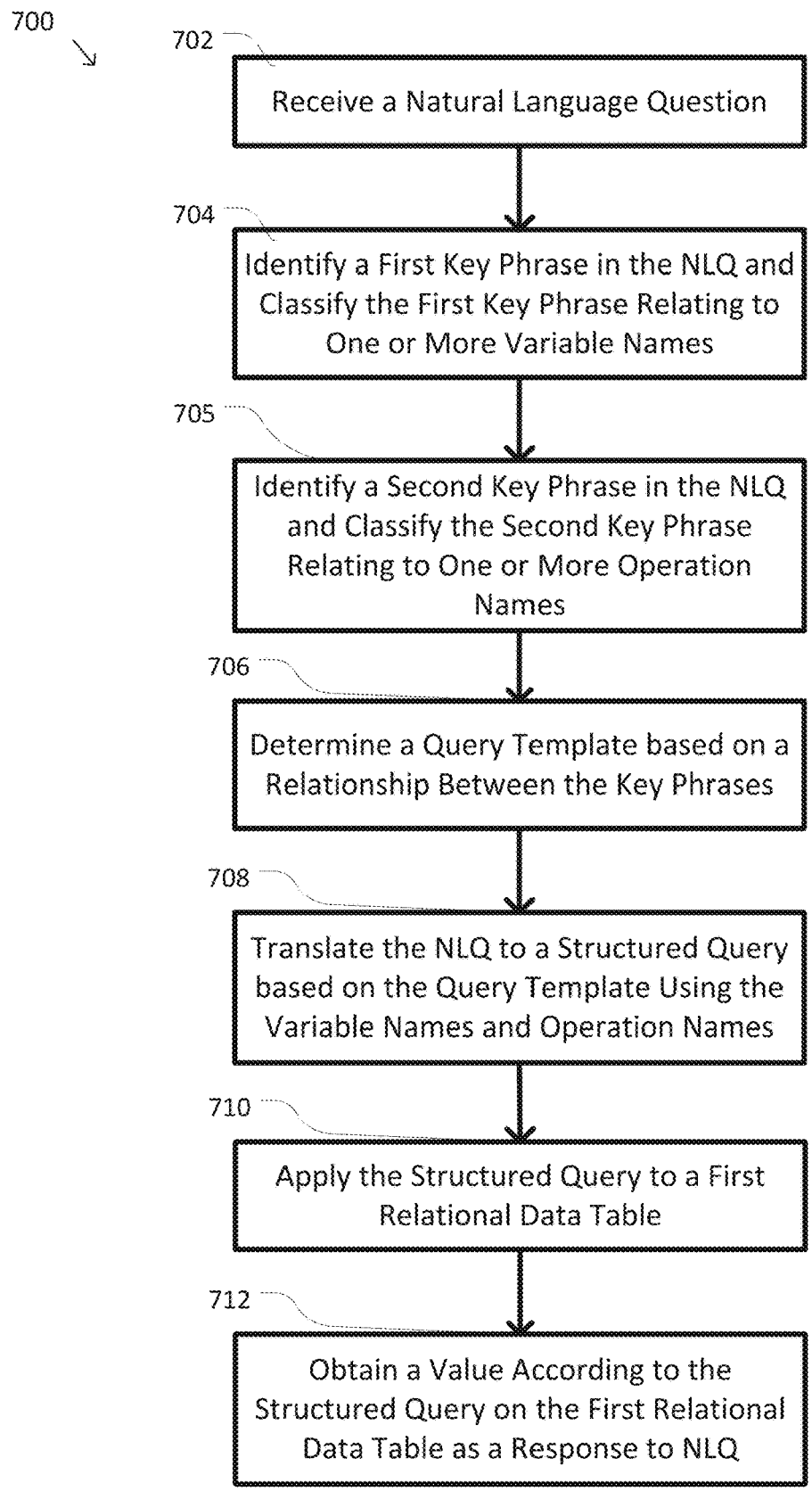
FIG. 7 is a simplified logic flow diagram illustrating a method for answering a natural language question using a data table, according to embodiments described herein.

FIG. 7 is a simplified logic flow diagram illustrating a method 700 for answering a natural language question using a data table, according to embodiments described herein. The example method 700 including processes 702-712 in FIG. 7 may be implemented, at least in part, in the form of executable code stored on non-transitory, tangible, machine-readable media that when run by one or more processors may cause the one or more processors to perform one or more of the processes 702-712. In some embodiments, these processes may correspond to the method used by the question answering module 330 to provide an answer to a natural language question based on data tables.

Starting at process 702, a natural language question is received, e.g., via a communication interface 305 in FIG. 3.

At process 704, a first key phrase is identified in the natural language question and the first key phrase is classified as relating to one or more variable names. For example, in the natural language question "which state has maximum selected candidates in 1999," a key phrase "state" may be found to correspond to a variable name "state."

At process 705, a second key phrase in the natural language question is identified and the second key phrase is classified as relating to one or more operation names. For example, in the natural language question "which state has maximum selected candidates in 1999," a key phrase "maximum" may be found to correspond to an operation name "max( )."

At process 706, a query template based on a relationship between the key phrases is determined. For example, upon identify the variable names and operation name(s) in the question "which state has maximum selected candidates in 1999," the question is defined with a template format of "which <variable_name1> has <operation name> <variable_ name2> in <variable_value>."

At process 708, the natural language question is translated to a structured database query based on the template format and the variable/operation names. For example, the natural language question having the template format of "which <variable_name1> has <operation name> <variable_name2> in <variable_value>" is mapped to a structured query "SELECT MAX (<variable_name2>), <variable_name1> from Table 605 where <variable_name3>=<variable_value>."

At process 710, the structured database query is applied to a relational data table. For example, the query "SELECT MAX(SEL), STATE FROM TABLE 605 WHERE YEAR=1999" is applied to the relational data table 605.

At process 712, in response to the query, a value is obtained from the relational data table as a response to the natural language question. For example, as shown in FIG. 6, the cell value "82" and "Delhi" under the column name "State" provides an answer that the state having the maximum selected candidates in 1999 is Delhi, with 82 selected candidates.

Figure 8:
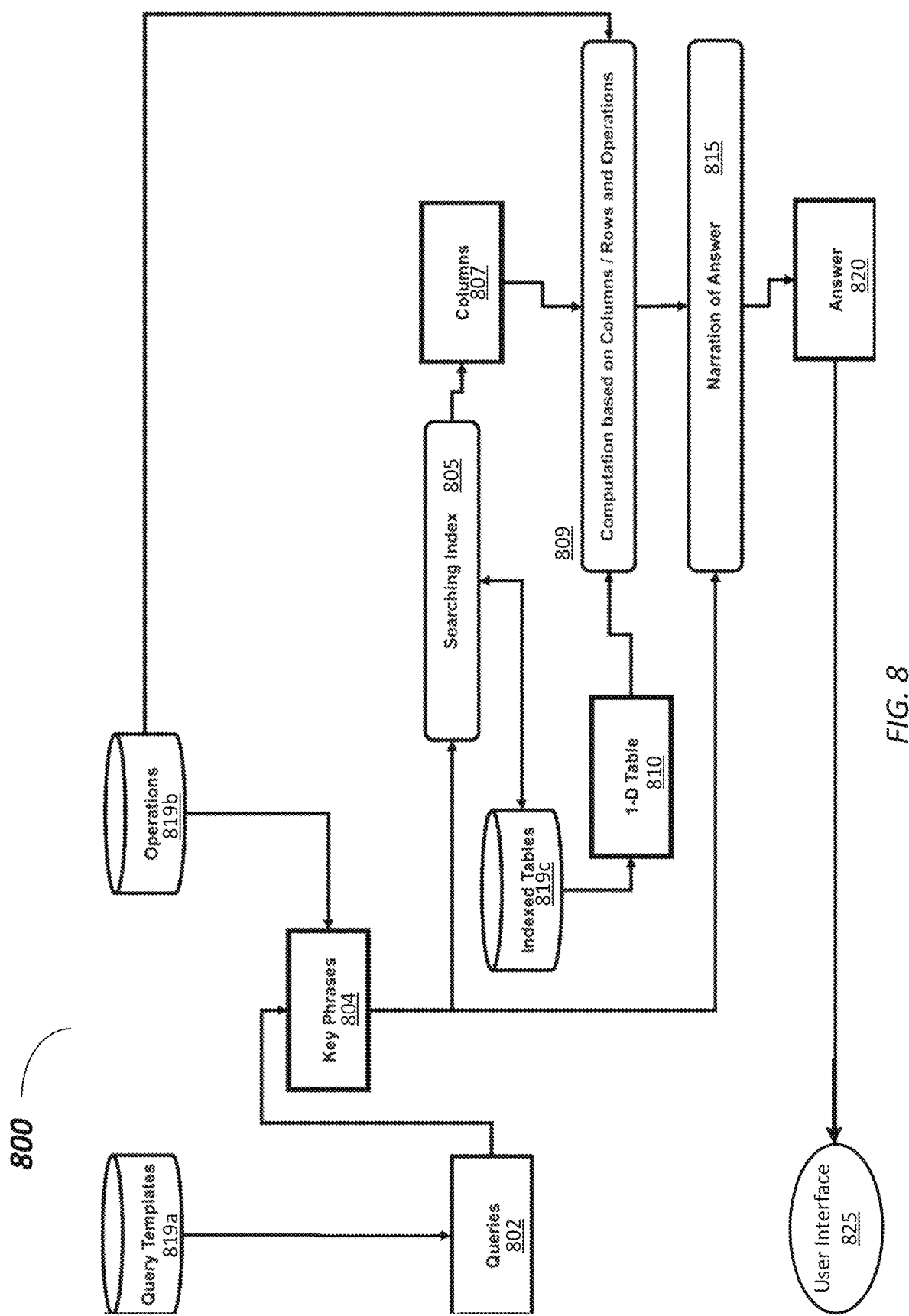
FIG. 8 is a simplified logic flow diagram illustrating a method for applying a database query on a relational data table in response to a natural language question, according to embodiments described herein.

FIG. 8 is a simplified logic flow diagram illustrating a method 800 for applying a database query on a relational data table in response to a natural language question, according to embodiments described herein. The example method 800 including processes 802-820 in FIG. 8 may be implemented, at least in part, in the form of executable code stored on non-transitory, tangible, machine-readable media that when run by one or more processors may cause the one or more processors to perform one or more of the processes 802-820. In some embodiments, these processes may correspond to the method used by the question answering module 330 to provide an answer to a natural language question based on data tables.

Continuing on from process 706 in FIG. 7, a database query 802 may be generated based on the query template from the template database 819a. The key phrases 804 from the database query 802, together with the operation name from the operations database 819b, are used to generate a search index 805. For example, in the query "SELECT MAX(SEL), STATE FROM TABLE 605 WHERE YEAR=1999" shown in FIG. 6, search index may be established for the column under column header "SEL." A one-dimensional data table 810 may then be chosen from an indexed database 819c using the search index. The selected column 807 is then used for computation based on the columns or rows and the operation name over the one-dimensional table 810 at process 809. For example, a maximum operation is performed on the selected column "SEL" and the resulting entry is retrieved.

At process 815, the answer is narrated based on the returned query result to provide an answer 820 via the user interface 825.

Figure 9:
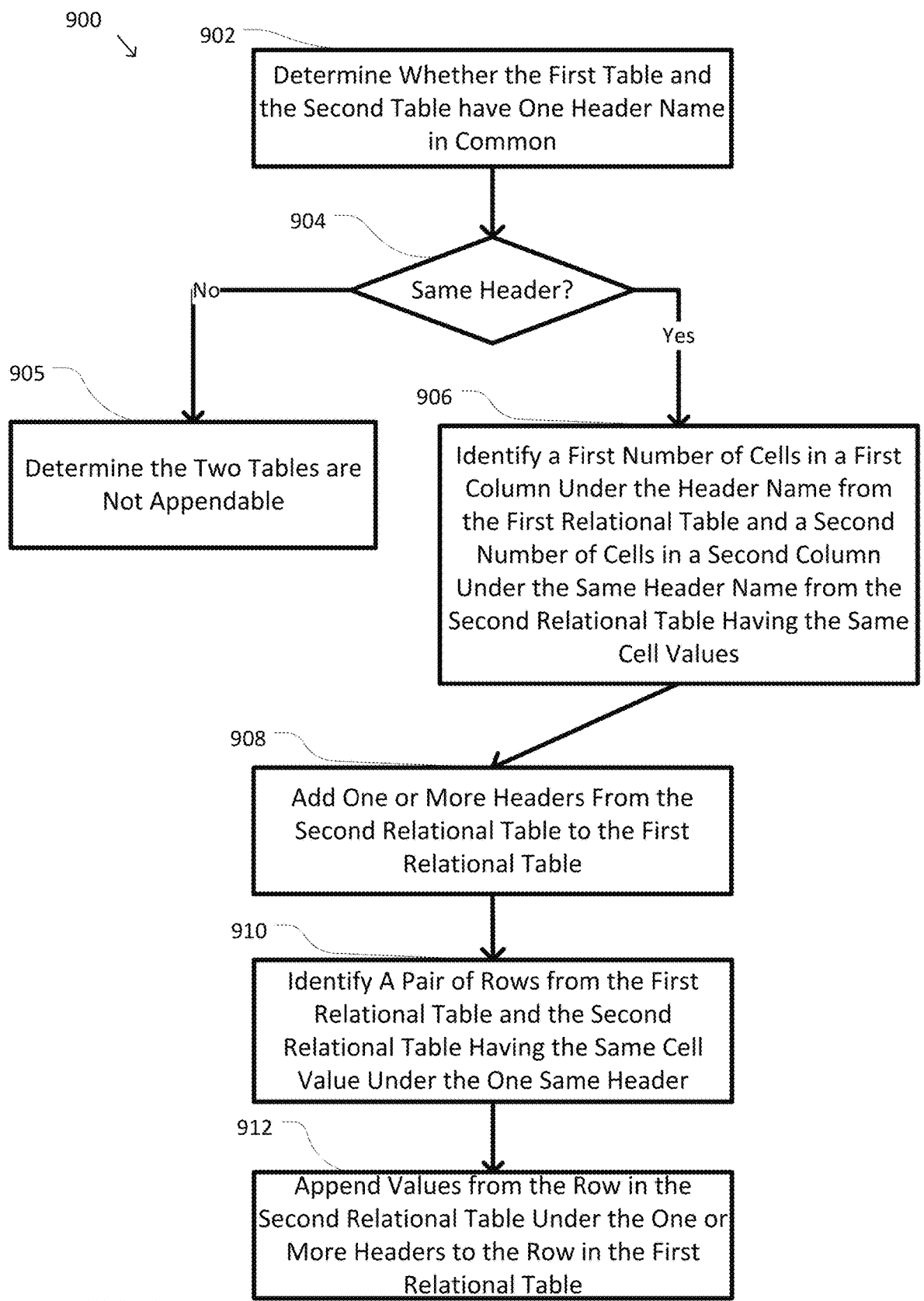
FIG. 9 is a simplified logic flow diagram illustrating a method for merging or appending one or more data tables as shown in FIG. 5B, according to embodiments described herein.

FIG. 9 is a simplified logic flow diagram illustrating a method 900 for merging or appending one or more data tables as shown in FIG. 5B, according to embodiments described herein. The example method 900 including processes 902-912 in FIG. 9 may be implemented, at least in part, in the form of executable code stored on non-transitory, tangible, machine-readable media that when run by one or more processors may cause the one or more processors to perform one or more of the processes 902-912. In some embodiments, these processes may correspond to the method used by the table structuralizing module 332 to merge one or more data tables into an aggregated data table for providing an answer to a natural language question.

At process 902, method 900 determines whether the first table and the second table have a header name in common. For example, as shown in FIG. 5B, data tables D1 501 and D2 502 have the same headers "Year," "Salary," "Fuel and Transport," "Bonus," etc., and data tables D3 503 and D4 504 have at least the header name "Year" in common. If no header in common, method 900 determines that the two tables are not appendable at process 905.

If the two data tables share at least one header, method 900 identifies a first number of cells in the first column under the shared header name from the first relational table and a second number of cells in a second column under the same header name from the second relational table having the same cell values. For example, as shown in FIG. 5B, the column "Year" including cells from "1998" to "2002" is identified in both data table D3 503 and D4 504.

At process 908, one or more headers from the second relational table is added to the first relational table. For example, the headers in data table D4 504 such as "Fuel and transport," "Interest on Loans," and "Taxes" are added to data table D3 503.

At process 910, a pair of rows from the first relational table and the second relational table corresponding to the same cell value under the same header are identified. For example, the row from data table D3 503 including cell values "1998," "288" and "3.00" and the row from data table D4 504 including cell values "1998," "98," "23.4" and "83," which share the same value "1998" under the header "Year" are identified.

At process 912, values from the identified row in the second relational table is then appended to the identified row in the first relational table. For example, the values from the identified row in data table D4 504, including "98," "23.4" and "83," are then appended to the row of "1998," "288" and "3.00" from data table D3 503. Process 912 may be repeated for all rows in the data tables to be merged to result in an aggregated table.

Some examples of computing devices, such as computing device 300, may include non-transitory, tangible, machine readable media that include executable code that when run by one or more processors (e.g., processor 310) may cause the one or more processors to perform the processes of methods 700-900. Some common forms of machine readable media that may include the processes and sub-processes of methods 700-900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for providing a response to a natural language question based on document tables, the system comprising:
 a communication interface that receives a natural language question;
 a memory containing machine readable medium storing machine executable code; and one or more processors coupled to the memory and configurable to execute the machine executable code to cause the one or more processors to:
  identify a first key phrase in the natural language question;
  classify the first key phrase as relating to one or more pre-stored variable names;
  identify a second key phrase in the natural language question;
  classify the second key phrase as relating to a pre-stored operation name indicating a logic to be applied upon the one or more pre-stored variable names;
  determine a query template based on a relationship represented by a third phrase connecting the first key phrase and the second key phrase in the natural language question;
  translate the natural language question to a structured query based on the query template using the one or more pre-stored variable names and the pre-stored operation name;
  apply the structured query to a first relational data table; and
  obtain a value according to the structured query on the first relational data table as a response to the natural language question.

2. The system of claim 1, wherein the one or more processors coupled to the memory and configurable to execute the machine executable code to cause the one or more processors to classify the first key phrase as relating to one or more pre-stored variable names by:
  retrieving a database of variable names;
  selecting, via a classification network, the pre-stored variable name as most relevant to the first key phrase from the database of variable names; and
  replacing the first key phrase in the natural language question with the pre-stored variable name.

3. The system of claim 1, wherein the one or more processors coupled to the memory and configurable to execute the machine executable code to cause the one or more processors to classify the second key phrase as relating to the pre-stored operation name:
  retrieving a database of operation names;
  selecting, via a classification network, the pre-stored operation name as most relevant to the second key phrase from the database of operation names; and
  replacing the second key phrase in the natural language question with the pre-stored operation name.

4. The system of claim 1, wherein the one or more processors coupled to the memory and configurable to execute the machine executable code to cause the one or more processors to determine the query template by:
  after replacing the first key phrase with the pre-stored variable name and the second key phrase with the pre-stored operation name:
    identifying the third phrase connecting the pre-stored variable and the pre-stored operation name in the natural language question;
    identifying a fourth phase remaining in the natural language question;
    searching, a database of query templates, based on a combination of the third phrase and the fourth phrase.

5. The system of claim 1, wherein the one or more processors coupled to the memory and configurable to execute the machine executable code to cause the one or more processors to further:
  select the first relational data table from a repository of relational data tables based at least on the pre-stored variable name.

6. The system of claim 5, wherein the one or more processors coupled to the memory and configurable to execute the machine executable code to cause the one or more processors to further:
  determine whether the selected first relational data table includes a column that provide the value in response to the structured query;
  when the selected first relational data table does not include a column that provides the value in response to the structured query:
    search for a second relational data table that contains the column providing the value;
    determine whether the second relational data table and the selected first relational data table are appendable; and
    merge the first relational data table and the second relational data table into an aggregated table when the first relational data table and the second relational data table are appendable.

7. The system of claim 6, wherein the one or more processors coupled to the memory and configurable to execute the machine executable code to cause the one or more processors to determine whether the second relational data table and the selected first relational data table are appendable by:
  determining whether the first relational data table and the second relational data table have at least one header name in common;
  determining that the first relational data table and the second relational data table are unappendable if the first relational data table and the second relational data table have no header name in common;
  When the first relational data table and the second relational data table have at least one header name in common:
    identifying a first number of cells in a first column under the one at least header name from the first relational data table and a second number of cells in a second column under the one at least header name from the second relational data table, wherein the first number of cells and the second number of cells have same cell values.

8. The system of claim 7, wherein the one or more processors coupled to the memory and configurable to execute the machine executable code to cause the one or more processors to merge the second relational data table and the selected first relational data table into an aggregated table by:
  adding one or more header names from the second relational data table to the first data table;
  for a first respective row where each cell from the first number of cells corresponds to:
    identifying a second respective row containing a respective matching cell from the second relational table;
    determining, from the second respective row, one or more cells that belong to the added one or more header names; and
    appending values from the one or more cells to the first respective row under the added one or more header names.

9. The system of claim 1, wherein the one or more processors coupled to the memory and configurable to execute the machine executable code to cause the one or more processors to further:
  identify a text document relating to the natural language question based on key work search;
  determine an unstructured table from the text document;
  convert the unstructured table into a one-dimensional table.

10. The system of claim 1, wherein the one or more processors coupled to the memory and configurable to execute the machine executable code to cause the one or more processors to further:
  identify a first unstructured table and a second unstructured table relating to one or more key phrases in the natural language query;
  determine whether the first unstructured table and the second unstructured table have a same header pattern; and
  add non-overlapping rows from the first unstructured table to the second unstructured table when the first unstructured table and the second unstructured table have the same header pattern.

11. A method for providing a response to a natural language question based on document tables, the method comprising:
  receiving, via a communication interface, a natural language question;
  identifying, via a processor, a first key phrase in the natural language question;
  classifying the first key phrase as relating to one or more pre-stored variable names;
  identifying a second key phrase in the natural language question;
  classifying the second key phrase as relating to a pre-stored operation name indicating a logic to be applied upon the one or more pre-stored variable names;
  determine a query template based on a relationship represented by a third phrase connecting the first key phrase and the second key phrase in the natural language question;
  translating the natural language question to a structured query based on the query template using the one or more pre-stored variable names and the pre-stored operation name;
  applying the structured query to a first relational data table; and
  obtaining a value according to the structured query on the first relational data table as a response to the natural language question.

12. The method of claim 11, wherein the classifying the first key phrase as relating to one or more pre-stored variable names comprises:
  retrieving a database of variable names;
  selecting, via a classification network, the pre-stored variable name as most relevant to the first key phrase from the database of variable names; and
  replacing the first key phrase in the natural language question with the pre-stored variable name.

13. The method of claim 11, wherein the classifying the second key phrase as relating to the pre-stored operation name comprises:
  retrieving a database of operation names;
  selecting, via a classification network, the pre-stored operation name as most relevant to the second key phrase from the database of operation names; and
  replacing the second key phrase in the natural language question with the pre-stored operation name.

14. The method of claim 11, wherein the determining the query template comprises:
  after replacing the first key phrase with the pre-stored variable name and the second key phrase with the pre-stored operation name:
    identifying a third phrase connecting the pre-stored variable and the pre-stored operation name in the natural language question;
    identifying a fourth phase remaining in the natural language question;
    searching, a database of query templates, based on a combination of the third phrase and the fourth phrase.

15. The method of claim 11, further comprising:
  selecting the first relational data table from a repository of relational data tables based at least on the pre-stored variable name.

16. The method of claim 15, further comprising:
  determining whether the selected first relational data table includes a column that provide the value in response to the structured query;
  when the selected first relational data table does not include a column that provides the value in response to the structured query:
    searching for a second relational data table that contains the column providing the value;
    determining whether the second relational data table and the first relational data table are appendable; and
    merging the second relational data table and the selected first relational data table into an aggregated table when the second relational data table and the selected first relational data table are appendable.

17. The method of claim 16, wherein the determining whether the other relational data table and the selected relational data table are appendable comprises:
  determining whether the first relational data table and the second relational data table have at least one header name in common;
  determining that the first relational data table and the second relational data table are unappendable if the first relational data table and the second relational data table have no header name in common;
  When the first relational data table and the second relational data table have at least one header name in common:
    identifying a first number of cells in a first column under the one at least header name from the first relational data table and a second number of cells in a second column under the one at least header name from the second relational data table, wherein the first number of cells and the second number of cells have same cell values.

18. The method of claim 17, wherein the merging the second relational data table and the selected first relational data table into an aggregated table comprises:
  adding one or more header names from the second relational data table to the first data table;
  for a first respective row where each cell from the first number of cells corresponds to:
    identifying a second respective row containing a respective matching cell from the second relational table;
    determining, from the second respective row, one or more cells that belong to the added one or more header names; and appending values from the one or more cells to the first respective row under the added one or more header names.

19. The method of claim 11, further comprising:

identifying a text document relating to the natural language question based on key work search;

determining an unstructured table from the text document;

converting the unstructured table into a one-dimensional table.

20. The method of claim 11, further comprising:

identifying a first unstructured table and a second unstructured table relating to one or more key phrases in the natural language query;

determining whether the first unstructured table and the second unstructured table have a same header pattern; and adding non-overlapping rows from the first unstructured table to the second unstructured table when the first unstructured table and the second unstructured table have the same header pattern.

* * * * *